B. W. FJELLMAN.
ROLLER BEARING.
APPLICATION FILED NOV. 21, 1917.
1,283,714.
Patented Nov. 5, 1918.
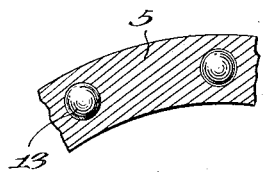
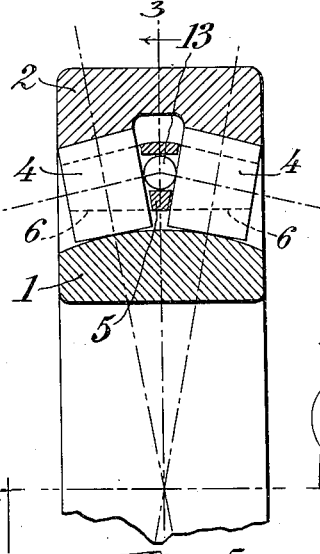
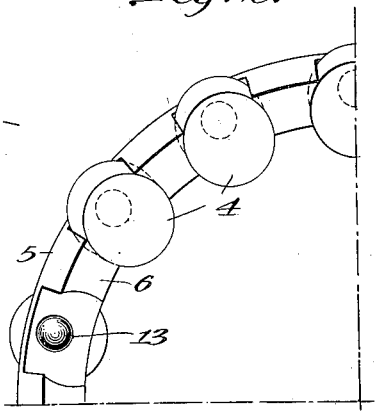
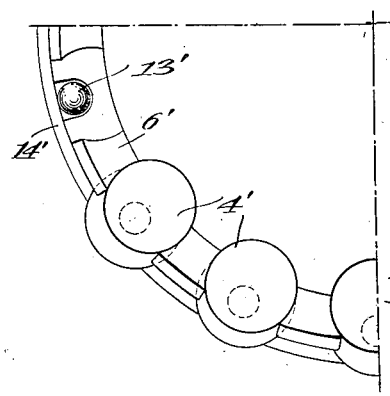
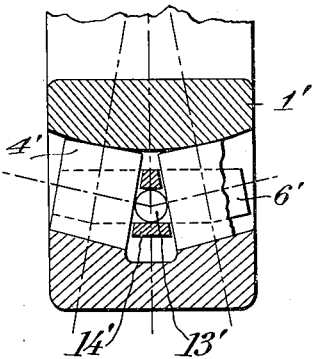
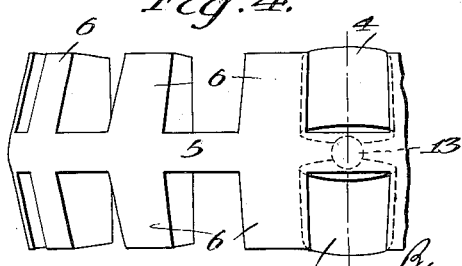
WITNESSES:
INVENTOR
By Attorneys,

UNITED STATES PATENT OFFICE.

BENGT WIKTOR FJELLMAN, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

ROLLER-BEARING.

1,283,714.   Specification of Letters Patent.   Patented Nov. 5, 1918.

Original application filed July 27, 1916, Serial No. 111,588. Divided and this application filed November 21, 1917. Serial No. 203,160.

*To all whom it may concern:*

Be it known that I, BENGT WIKTOR FJELLMAN, subject of the King of Sweden, residing at Gottenborg, in the Kingdom of Sweden, have invented certain new and useful Improvements in Roller-Bearings, of which the following is a specification.

This invention relates to double row roller bearings having outwardly tapering conical rollers, and a spacing device between the rows of rollers located in position relatively to the transverse central plane of the bearing to receive the thrust from the race rings which tends to move the rollers inwardly toward the transverse central plane of the bearing. The object of the invention is to provide a spacing device which will present the minimum friction to the rollers while engaging them in the most effective region. The improvement provides a spacing device having a plurality of balls for engaging the rollers in the region of their axes, a further object of the invention being to provide a combined spacing device and cage for the balls, and in certain embodiments of the invention the cage for the spacing balls forming a retainer both for the rollers and the balls.

This present application is a division of my copending application Serial No. 111,588 filed July 27, 1916, for roller bearings, the drawings in this application constituting Figure 10 of the drawings of said parent application as originally filed.

In the drawings accompanying this application a practicable embodiment of my invention is illustrated in which drawings—

Fig. 1 is a longitudinal section of one-half of the bearing;

Fig. 2 is an elevation of a segment of the cage shown in Fig. 1, it being broken away at one of the ball seats;

Fig. 3 is a detail of the cage in longitudinal section at about the plane of line 3—3, Fig. 1;

Fig. 4 is a view of the portion of the cage shown in Fig. 2, looking at this from the left-hand side;

Fig. 5 is a longitudinal section of one-half of the bearing, showing a modified form of cage, and Fig. 6 is a view similar to Fig. 2 and showing the cage of Fig. 5.

The inner ring 1 of the bearing is shown in Figs. 1 to 4 provided with a spherical race, and the outer ring 2 is shown provided with two conical races having their apices on the axis of the bearing. Between the rings there are mounted two sets of rollers 4 which are also shown conical in shape, the apices of the cones coinciding with the apices of the cones formed by the outer races. Placed between the two rows of rollers for spacing the same apart is a series of balls 13. The ends of the rollers at the point of engagement with the balls are accurately ground so that the rollers will be properly positioned by the balls. The spacing device maintains the rollers in their proper positions relatively to the radial center plane of the bearings and receives the thrust of the rollers in their tendency to move inwardly of the bearing. In the illustration, the balls are shown carried by a ring 5 having suitable seats for the balls and constituting a cage therefor. The ring 5 is shown provided at both sides with wings or projections 6 designed to enter between the rollers of each set or row and keep the rollers at each set at predetermined distances from one another. Each roller is shown located in the space between two adjacent wings 6, which wings position the rollers in respect to the balls and the ball seats. The ring 5 will thus be seen to constitute a retainer or spacer for the rollers and a cage or retainer for the balls to position each in respect of the other.

The balls 13 are shown placed in pockets in the form of holes in the ring 5. In Figs. 5 and 6 the balls 13' are shown disposed in outwardly open pockets in the ring 5', in which latter case they are preferably kept in position by an outer ring 14'.

Changes may be made within the scope of the claims without departing from the spirit of the invention.

I claim as my invention:—

1. A double row roller bearing having outwardly tapering conical rollers, the inner end of each roller being ground accurately plain at or in the proximity of its axis, a spacing device between the two rows of rollers comprising balls for engaging the inner ends of the respective rollers at or in the proximity of the axis of each.

2. A double row roller bearing having outwardly tapering conical rollers, the inner end of each roller being provided with an accurately ground face at the region of its axis, a spacing ring located between the rows of rollers and provided with a series of ball pockets, and balls in the said pockets and engaging the said accurately ground faces on the inner ends of the rollers.

3. A double row roller bearing having outwardly tapering conical rollers, the inner end of each roller being provided with an accurately ground face at the region of its axis, a spacing ring located between the rows of rollers and provided at both sides with wings or projections located between the rollers, said ring also having pockets adjacent the spaces between the wings for receiving balls, and a ball in each of said pockets.

4. A double row roller bearing having outwardly tapering conical rollers, the inner end of each roller being provided with an accurately ground face at the region of its axis, a spacing ring located between the rows of rollers and provided at each side with wings adapted to enter between the rollers, the spaces between the said wings on the respective sides of the spacing ring being in alinement axially of the bearing, and said ring having pockets at such spaces for receiving balls, and a ball in each such pocket located in position to engage the inner end of a roller of each row.

In testimony whereof I affix my signature.

BENGT WIKTOR FJELLMAN.